United States Patent [19]

Briles

[11] Patent Number: 4,583,897
[45] Date of Patent: Apr. 22, 1986

[54] ANNULAR DOVETAIL HEAD FASTENER

[76] Inventor: Franklin S. Briles, 2640 Vista Pacific Dr., Oceanside, Calif. 92056-3599

[21] Appl. No.: 590,831

[22] Filed: Mar. 19, 1984

[51] Int. Cl.$^4$ ............................................. F16B 35/00
[52] U.S. Cl. .................................. 411/378; 411/531; 403/408.1
[58] Field of Search ............... 411/378, 411, 424, 531, 411/546, 907, 908, 500, 501, 502, 503, 504, 505, 506, 507, 366, 367, 368; 403/408, 405

[56] References Cited

U.S. PATENT DOCUMENTS

| | | | |
|---|---|---|---|
| 31,749 | 10/1899 | North | 411/411 X |
| 1,827,628 | 10/1931 | Twedell | 411/424 |
| 3,122,406 | 2/1964 | Modrey | 411/411 X |
| 3,239,036 | 3/1966 | Scott | 411/907 X |
| 3,680,429 | 8/1972 | Briles . | |
| 3,815,220 | 6/1974 | Briles . | |
| 3,849,964 | 11/1974 | Briles . | |
| 3,908,257 | 9/1975 | Briles . | |
| 3,921,364 | 11/1975 | Briles . | |
| 3,933,025 | 1/1976 | Briles . | |
| 3,934,330 | 1/1976 | Briles . | |
| 4,000,680 | 1/1977 | Briles . | |
| 4,040,164 | 8/1977 | Briles . | |
| 4,048,708 | 9/1977 | Briles . | |
| 4,050,833 | 9/1977 | Briles . | |
| 4,051,592 | 10/1977 | Briles . | |
| 4,086,839 | 5/1978 | Briles . | |
| 4,159,666 | 7/1979 | Briles . | |
| 4,370,081 | 1/1983 | Briles . | |

FOREIGN PATENT DOCUMENTS

| | | | |
|---|---|---|---|
| 174340 | 8/1906 | Fed. Rep. of Germany | 411/501 |
| 1098989 | 3/1955 | France | 411/378 |
| 1322847 | 2/1963 | France | 411/531 |
| 1423901 | 11/1965 | France | 411/378 |
| 445433 | 2/1949 | Italy | 411/378 |
| 426792 | 4/1935 | United Kingdom | 411/531 |
| 853002 | 11/1960 | United Kingdom | 411/411 |
| 911262 | 11/1962 | United Kingdom | 411/378 |

Primary Examiner—Alexander Grosz
Assistant Examiner—Adrain H. Whitcomb, Jr.
Attorney, Agent, or Firm—William W. Haefliger

[57] ABSTRACT

A fastener having a shank receivable in a work bore, and a head receivable in a work counterbore, the shank extending in an axial direction rearwardly from the head, the improvement comprising
 (a) the head having an annular side wall receivable in said counterbore,
 (b) the head having a front end wall, and a rear wall that tapers radially outwardly and rearwardly, the rear wall spaced rearwardly from said front wall for engagement with a work surface that also tapers radially outwardly and rearwardly.

15 Claims, 7 Drawing Figures

U.S. Patent  Apr. 22, 1986  4,583,897
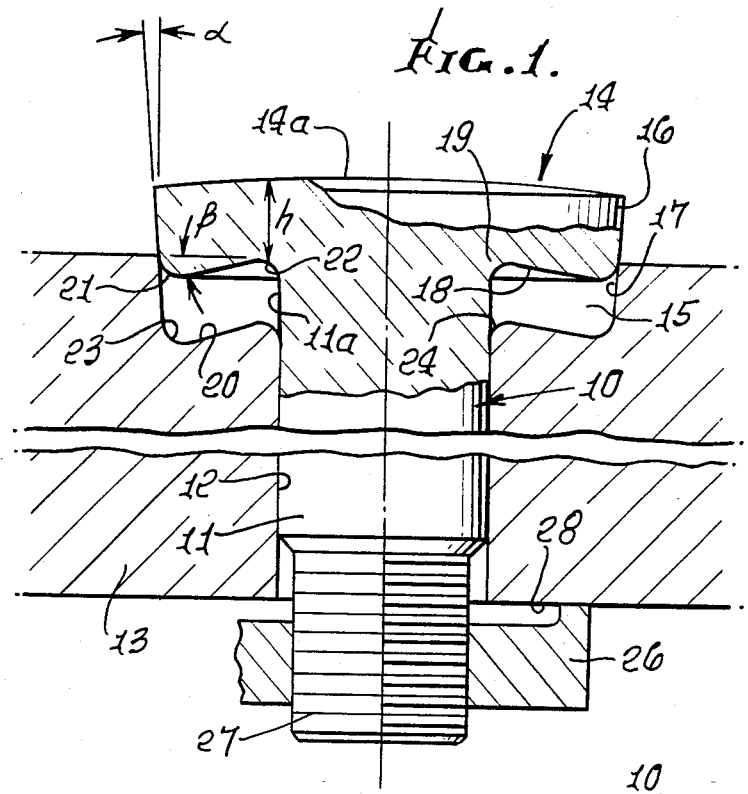
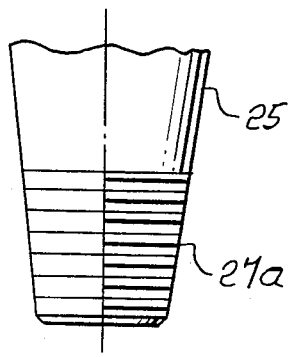
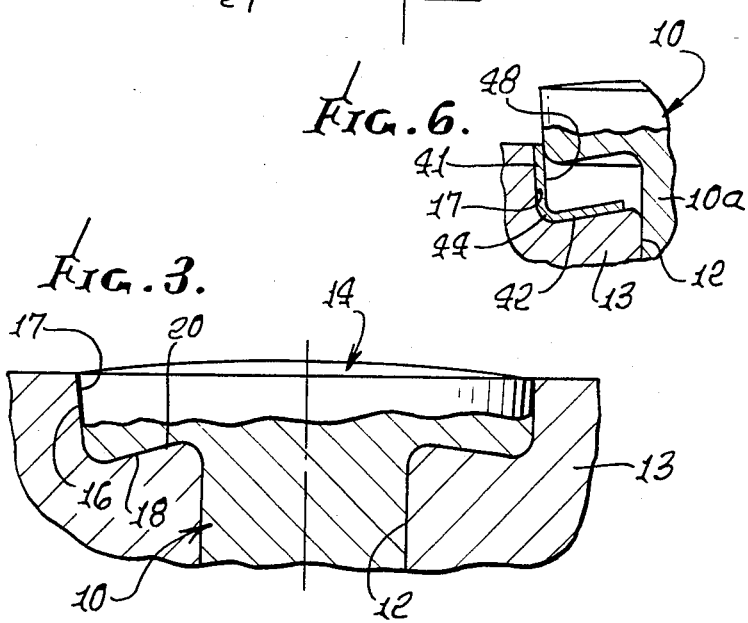
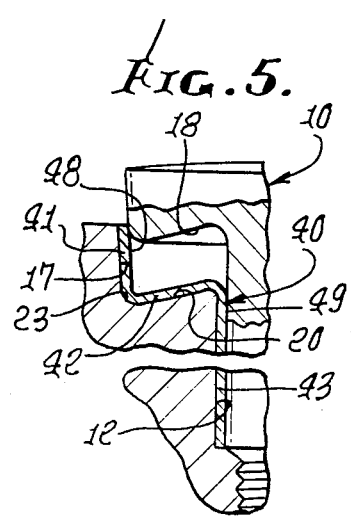
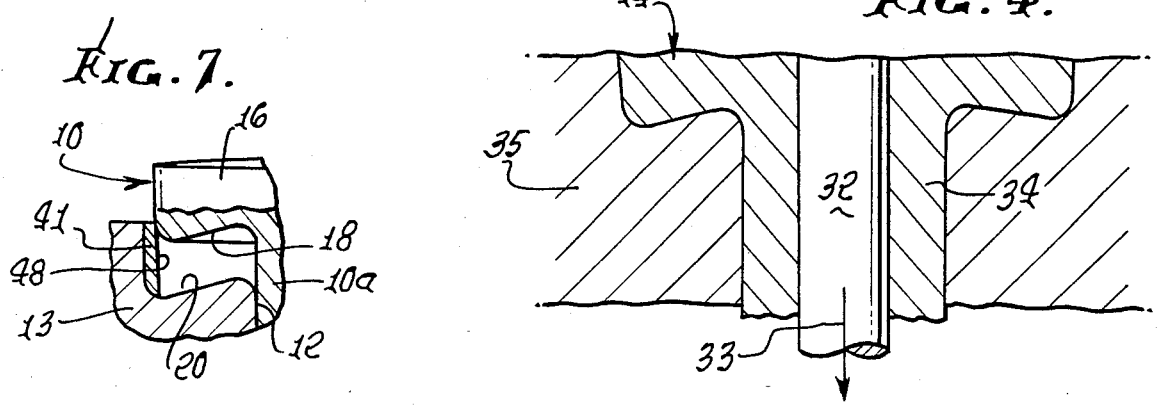
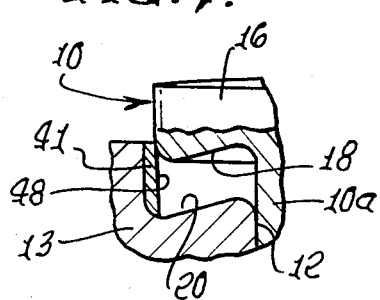

ANNULAR DOVETAIL HEAD FASTENER

BACKGROUND OF THE INVENTION

This invention relates generally to fasteners, and more particularly to seating of fastener heads in structure or workpiece counterbore recesses.

Fastener stability in structure, particularly under vibrating and shear loads, is a continual problem. Heads of fasteners can tend to work loose, and vibration of fastener shanks and heads can produce wear and powdering of contact surfaces. There is clearly a need for improvement in the construction of fasteners to overcome these and related problems.

SUMMARY OF THE INVENTION

It is a major object of the invention to provide an improved fastener meeting the above need, and having a shank receivable in a workbore and a head receivable in a work counterbore, the shank extending axially rearwardly from the head. The fastener then comprises:

(a) the head having an annular side wall receivable in said counterbore, (b) the head having a front end wall, and a rear wall that tapers radially outwardly and rearwardly, the rear wall spaced rearwardly from said front wall for engagement with a work surface that also tapers radially outwardly and rearwardly.

As will appear, the head rear wall typically forms an annular undercut in the head whereby the head axial thickness decreases radially inwardly from said head side wall; the head rear wall has angularity relative to a plane normal to the shank axis of between 1° and 22°; and the head side wall typically has angularity relative to the shank axis of between 0° and 15°.

In addition, provision of stable seating of the head in the work counterbore recess is enhanced by convexly and annularly merging the head rear wall with the head side wall in matched relation to concave merging of work first and second counterbores; and by concavely and annularly merging the head rear wall with the shank outer surface in matched relation to convex annular merging of the work second counterbore surface with the work bore that receives the shank. Seating of the head at such matched arcuate surfaces maximizes the head stability in seated position.

In addition, the shear bearing area of the joint is desirably increased by causing the length of the head annular side wall combined with the shank length to equal, or approximately equal, the total thickness of the workpiece.

Finally, means to hold and urge the head in the counterbore recess may take various forms, as will appear, and a work sleeve may be employed, as will be seen.

These and other objects and advantages of the invention, as well as the details of an illustrative embodiment, will be more fully understood from the following description and drawings, in which:

DRAWING DESCRIPTION

FIG. 1 is an elevation showing the fastener prior to completed head reception in the work counterbore;

FIG. 2 shows a tapered shank;

FIG. 3 is a view like FIG. 1, showing the fastener and work after completed reception in the counterbore; and FIG. 4 is a section showing a modification;

FIGS. 5-7 show further modifications.

DETAILED DESCRIPTION

In FIG. 1, a fastener 10 has a shank 11 receivable in bore 12 in work piece 13, and a head 14 receivable in a counterbore recess 15 in the work. The work may consist of one, two, or several stacked or bonded together sheets or members, which may be metallic or non-metallic (examples are aluminum, titanium, steel, KEVLAR, graphite, boron, etc). The fastener is typically metallic, as for example titanium, steel, aluminum, titanium alloy, aluminium alloy, monel, and/or high temperature alloys such as INCO 718 or refractory materials.

The head has an annular side wall 16 receivable in the counterbore to face the first counterbore side wall 17, and may forcibly engage the latter with interference, as in FIG. 3, to place that wall 17 in radial compression and peripheral tension, as when the work is metallic. When the work is non-metallic, there is preferably only slight or no interference between walls 16 and 17, to minimize powdering or abrasion of work material when engaging the fastener. Matching taper angularity $\alpha$ of the walls 16 and 17 is within the range 0° and 15°.

The head also has a front or end wall 14a, and an annular rear wall 18 extending about zone of shank connection at 19 to the head. Front wall 14a may be slightly domed, as shown, to increase the head section dimension "h", i.e. the axial thickness at the locus of head connection to the shank, for increased strength.

Rear wall 18 tapers radially outwardly at an angle $\beta$ to horizontal, $\beta$ lying within the range 1° to 22°. Rear wall 18 defines or forms an annular undercut or dovetail in the head, whereby the head axial thickness decreases radially inwardly from the head side wall 16 to the minimum thickness section at "h". As a result, the head becomes seated in the counterbore with extreme stability, to minimize or eliminate any tendency to work free under vibratory conditions. Note that workpiece 13 also forms a second counterbore 20 which defines a work annular surface that also tapers radially outwardly and rearwardly generally parallel to head surface 18, thereby to firmly seat and center the head in the counterbore recess 15.

The head rear wall 18 also merges annularly and convexly at 21 with the head side wall 16, and it merges annularly and concavely at 22 with the shank outer surface 11a. Further, the work second counterbore surface 20 merges annularly and concavely at 23 with the work first counterbore surface 17; and counterbore surface 20 merges annularly and convexly at 24 with the workbore 12. Convex surface 21 matches concave surface 23; and concave surface 22 matches convex surface 24, whereby these matching surfaces engage, as in FIG. 3, to add materially to seating stability and retention of the head in the counterbore recess 15, under load, and under vibratory loading.

The fastener shank may be axially straight, as in FIGS. 1 and 3, or tapered as at 25 in FIG. 2. Means to hold the fastener head in seated position, as in FIG. 3, may take various forms, such as a nut 26 on shank end thread 27, the nut tightened against work surface 28. See also thread 27a in FIG. 2. Alternately, the fastener may comprise a blind fastener of the type shown in U.S. Pat. No. 4,370,081 to Briles, wherein the shank is tubular, and is urged in axial direction to seat the head by a control stem which may be threaded or unthreaded. FIG. 4 illustrates such a central stem 32, with means (a nut for example) urging the stem in direction 33, to seat the head (not shown) integral with tubular shank 34. The work appears at 35.

Tests show that by providing head axial thickness that increases away from center (see angle β), there is assurance of meeting the maximum shear strength of the material under axial loading.

Referring now to FIGS. 5–7, the work may be considered to include a sleeve carried by the panel means, and defining at least one of the work bore, work counterbore and work surface that tapers radially outwardly and rearwardly. As shown in FIG. 5, the sleeve 40 has a first section 41 received or located in the panel counterbore 17, a second section 42 that engages panel surface 20, and a third section 43 received or located in the panel bore 12.

Note also the sleeve curved sections 44 and 45 received or located adjacent panel curved annular surfaces 23 and 24. The sleeve thickness is typically between about 0.004 and 0.030 inches, and it may consist of material selected from the following group: stainless steel, aluminum and alloys thereof, titanium and alloys thereof, rigid vinyl material, tetrafluoroethylene copolymer and NYLON. The sleeve may be inserted as a unit, or painted or sprayed on surfaces 12, 20 and/or 17.

Thereafter when the fastener 10 is inserted into the sleeve, it typically has interference engagement with the sleeve (work) counterbore 48 and/or with the sleeve bore 49, so as to exert radially outward loading on the sleeve, which in turn exerts radially outward compressive loading on the panel counterbore 17 and/or panel bore 12. Such interference with the sleeve is between about 0.001 and 0.012 inches. Also, axial loading may be exerted by the fastener head rear wall 18 against sleeve second section 42, to axially load or compress the panel annular surface 20. Such sleeve transferred loading on the panel is of particular advantage where the panel or panels is or are non-metallic, one example being graphite, so that abrasion or powdering of panel surfaces is avoided as during fastener insertion.

In FIG. 6, the construction is the same as in FIG. 5, excepting that sleeve third section 43 and curved section 45 are omitted. In this event the fastener shank 10a directly engages panel bore 12.

In FIG. 7, the construction is the same as in FIG. 5, excepting that sleeve second and third sections 42 and 43 as well as curved section 45 are omitted. In this event fastener shank 10a directly engages panel bore 12, and head rear wall 18 engages panel or work counterbore surface 20 when the head is fully inserted.

Another version of the sleeve, implicitly shown in FIG. 5, would include sleeve sections 42 and 43 in position as seen, but section 41 would be omitted. Head wall 16 would then be configured or enlarged to directly and compressively engage panel counterbore surface 17.

I claim:

1. In combination, a fastener having a shank received in a work bore, and a head received in work counterbore, the shank extending in an axial direction rearwardly from the head, the improvement comprising
   (a) the head having an annular side wall received in said counterbore,
   (b) the head having a front end wall, and a rear wall that tapers radially outwardly and rearwardly, the rear wall spaced rearwardly from said front wall for engagement with a work surface that also tapers radially outwardly and rearwardly,
   (c) and including said work, the work having a first pre-formed counterbore facing the side wall of the head and extending parallel thereto, and a second counterbore which comprises said work surface that tapers radially outwardly and rearwardly and extends parallel to the head rear wall, the head rear wall engaging said work second counterbore surface, the work having an outer surface, and the perimeter of the head front wall being substantially flush with the work outer surface,
   (d) the head side wall tapering rearwardly and having tapered angularity between 0° and 15°,
   (e) the head rear wall having frusto-conical tapered angularity, relative to a plane normal to said axis, between 1° and 22°, and between loci closely proximate said shank and proximate said side wall,
   (f) the head rear wall merging convexly and annularly with the head side wall, the head thickness gradually and progressively diminishing radially inwardly from the locus of said convex merging to said locus proximate the shank which locus is annularly concave.

2. The fastener of claim 1 wherein said rear wall forms an annular undercut in the head whereby the head axial thickness decreases radially inwardly from said head side wall.

3. The fastener of claim 1 wherein the head front wall is shallowly domed.

4. The fastener and work of claim 2 wherein the work second counterbore merges annularly concavely with the work first counterbore.

5. The fastener and work of claim 4 wherein the work second counterbore merges annularly convexly with the work bore.

6. The fastener and work of claim 1 including means on the shank for holding the fastener head in said work counterbore.

7. The fastener of claim 1 wherein the head front wall is forwardly domed to increase the head axial thickness at the locus of head connection to the shank.

8. The fastener of claim 1 wherein the length of the wall engaging generally axially directed length of the head side wall and the length of the shank are in toto, approximately equal to the total thickness of the work, at said bore and counterbore.

9. The combination of claim 5 wherein said head merging rear wall and side wall engage said workpiece merging first and second counterbores.

10. The combination of claim 9 wherein said head rear wall merging with said shank outer surface engages said work second counterbore merging with said work bore.

11. The combination of claim 1 wherein the work includes panel means and a sleeve carried thereby and defining at least one of said work bore, said work counterbore, and said work surface that tapers radially outwardly and rearwardly.

12. The combination of claim 11 wherein said sleeve has thickness between 0.004 and 0.030 inches.

13. The combination of claim 11 wherein said sleeve defines at least one of:
   (i) said work counterbore and work surface,
   (ii) said work bore, and work surface,
   (iii) said work counterbore, said work bore and said work surface.

14. The combination of one of claims 11 and 13 wherein said sleeve consists essentially of material selected from the group consisting essentially of stainless steel, aluminum and alloys thereof, titanium and alloys thereof, rigid vinyl material, tetrafluoroethylene copolymer, and NYLON.

15. The combination of claim 11 wherein the fastener has interference engagement with the sleeve between 0.001 and 0.012 inches.

* * * * *